US006849161B2

(12) United States Patent
Ricard

(10) Patent No.: US 6,849,161 B2
(45) Date of Patent: Feb. 1, 2005

(54) PROCESS FOR THE PRODUCTION OF ANHYDROUS HYDRAZINE AND DEVICE FOR ITS IMPLEMENTATION

(75) Inventor: Jean-Philippe Ricard, Levallois-Perret (FR)

(73) Assignee: Arkema, La Defense Cedex (FR)

(*) Notice: Subject to any disclaimer, the term of this patent is extended or adjusted under 35 U.S.C. 154(b) by 125 days.

(21) Appl. No.: 10/041,263

(22) Filed: Oct. 25, 2001

(65) Prior Publication Data

US 2002/0144887 A1 Oct. 10, 2002

(30) Foreign Application Priority Data

Oct. 26, 2000 (FR) .............................. 00 13768

(51) Int. Cl.[7] .............................. B01D 3/36; B01D 3/14; C01B 21/16
(52) U.S. Cl. .............................. 203/14; 203/78; 203/80; 423/407
(58) Field of Search .............................. 203/2, 91, 100, 203/98, 71, 73, 78, 80, 95–96, 12, 14, 92; 423/407

(56) References Cited

U.S. PATENT DOCUMENTS

| 2,698,286 A | * | 12/1954 | Bircher, Jr. .................. 203/12 |
| 2,740,692 A | * | 4/1956 | Ryker et al. ................. 423/407 |
| 4,804,442 A | * | 2/1989 | Rigsby ......................... 203/12 |

FOREIGN PATENT DOCUMENTS

| CA | 599033 | * | 5/1960 |
| GB | 620713 | * | 3/1949 |
| GB | 695264 | * | 8/1953 |
| GB | 713792 | * | 8/1954 |
| GB | 890240 | * | 2/1962 |

* cited by examiner

Primary Examiner—Virginia Manoharan
(74) Attorney, Agent, or Firm—Millen White Zelano & Branigan, P.C.

(57) ABSTRACT

The present invention relates to a process for preparing anhydrous hydrazine. The process can include distilling an unconcentrated aqueous hydrazine solution into a starting binary solution, distilling the starting binary solution at a pressure where a concentration of hydrazine in the binary solution is greater than a concentration of an azeotrope at the distillation pressure, and recovering the anhydrous hydrazine.

19 Claims, 1 Drawing Sheet

Figure 1:
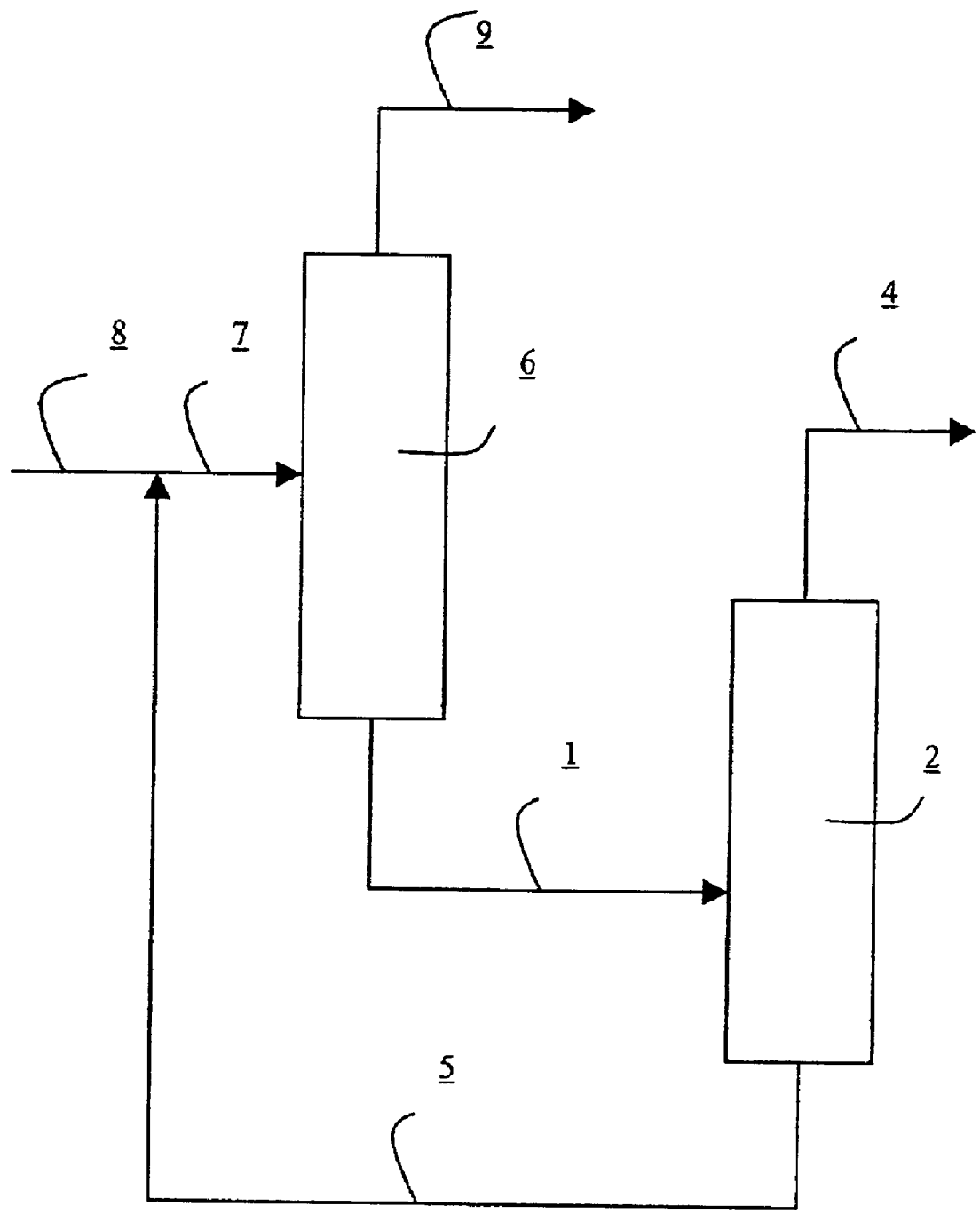

PROCESS FOR THE PRODUCTION OF ANHYDROUS HYDRAZINE AND DEVICE FOR ITS IMPLEMENTATION

CROSS REFERENCE TO RELATED APPLICATION

This application claims priority to French Patent Application No. 00 13 768 filed Oct. 26, 2000.

A subject matter of the invention is a process for the production of anhydrous hydrazine which does not involve a third substance. Another subject matter is a device for its implementation.

Hydrazine and water form an azeotrope; under (partial) pressure of the solution equal to one atmosphere, the hydrazine content in the azeotropic solution is approximately 69% (by weight).

A third substance is conventionally used during the azeotrope distillation; aniline is very widely used as entrainment agent. However, the use of a third substance presents numerous problems; it is therefore desirable not to use this third substance. In so far as hydrazine and water form an azeotrope, conventional distillation does not allow substantially pure hydrazine to be obtained except when the hydrazine content in the feed solution to be distilled is greater than 70% by weight. In fact, the document "Hydrazine and its derivatives; preparation, properties, applications" by E. Schmidt, published by John Wiley & Sons, 1984, teaches that, if the feed of the column is a solution comprising more than 70% by weight of hydrazine, then pure hydrazine will exit at the top of the column whereas the (maximum-temperature) azeotrope will exit at the bottom. This same document teaches, to achieve such values of greater than or equal to 70%, only the distillation in the presence of a third substance (in particular aniline). This same document anyhow teaches that the hydrazine-water azeotrope is not substantially influenced by the pressure variations, the variations in concentrations being a maximum of 3% by weight over a pressure range from 16 to 95 kPa.

The invention provides a process for the production of anhydrous hydrazine which does not involve any third substance and which is implemented in a conventional distillation plant.

The anhydrous hydrazine produced by the process according to the invention comprises less than 1% by weight, advantageously less than 0.1% by weight, of water.

Thus, the invention provides a process for the preparation of anhydrous hydrazine which comprises the stage of distillation of a starting binary aqueous hydrazine solution, the concentration of hydrazine in said solution and the distillation pressure being chosen so that said concentration is greater than the value of that of the azeotrope under consideration at the distillation pressure.

According to one embodiment, the distillation is carried out under a pressure of less than 500 mbar for a concentration of hydrazine in the starting solution of greater than or equal to 68%, under 1 bar.

According to another embodiment, the distillation is carried out under a pressure of between 50 and 400 mbar, preferably between 50 and 150 mbar.

According to another embodiment, the distillation is carried out at a top temperature corresponding to the boiling point of hydrazine under the pressure under consideration and at a bottom temperature corresponding to the boiling point of the azeotrope recovered.

According to another embodiment, the process comprises the stage of preparation of the starting solution by distillation of an unconcentrated aqueous hydrazine solution. This distillation is preferably carried out at a (partial) pressure of greater than 400 mbar.

Another subject matter of the invention is a device for the preparation of anhydrous hydrazine, which comprises a pipe (1) for feeding with a starting aqueous hydrazine solution, a distillation column (2), means (3) for adjusting the pressure in said column to a value such that the concentration of hydrazine in the starting solution is greater than the value of that in the azeotrope under consideration at the pressure in said column (2), a top pipe (4) for withdrawing anhydrous hydrazine and a bottom pipe (5) for withdrawing an aqueous hydrazine solution.

According to one embodiment, said means (3) for adjusting the pressure comprise pumps or means for producing a vacuum.

According to another embodiment, said means (3) for adjusting the pressure comprise an inert gas feed. An inert gas feed advantageously makes it possible to operate under satisfactory safety conditions, the reference pressure then being represented by the partial pressures apart from inert pressure.

According to another embodiment, the device additionally comprises a second column (6) from which the starting solution is withdrawn at the bottom via the pipe (1).

According to another embodiment, the aqueous hydrazine solution in the pipe (5) is recycled to the feed pipe (7) of the second column (6).

The device according to the invention is adapted for the implementation of the process according to the invention.

The invention is now described in more detail with reference to the appended FIGURE, which represents a device for the implementation of the invention.

An aqueous hydrazine solution, for example under a pressure of 1 bar and comprising hydrazine, is introduced via the pipe (1). This concentration, for example 69.3% by weight, is slightly less than the concentration in the azeotrope, i.e. 69.40% at a pressure of 1 bar. This solution enters the distillation column (2). This distillation column is conventional. It is operated under a pressure, for example of 150 mbar. It is clear that this pressure in the column (i.e. the pressure of the distillation according to the invention) is the partial pressure of the solution to be distilled. An inert gas can be injected into the column, so that the column operates at atmospheric pressure but under a hydrazine solution partial pressure of, for example, 150 mbar. Means (3) (not represented) which make it possible to achieve these partial pressure values are conventional. They can comprise, for example, ejectors, pumps or means for producing vacuum or an inert gas feed.

The temperature of the top condenser of the column is preferably set at the boiling point of pure hydrazine under the pressure under consideration. The temperature of the bottom boiler of the column is preferably set at the boiling point of the azeotrope collected at the bottom (still under the pressure under consideration). The azeotrope collected at the bottom comprises, for the pressures and concentrations chosen as examples, 67.6% by weight of hydrazine. However, it is possible to vary these temperatures, provided that they make it possible to obtain the streams under consideration.

It is clear that the contents in the various streams can be varied. However, care is taken that the concentration in the starting solution is greater than the concentration in the azeotrope which is obtained under the operating pressure of the column. Thus, starting from a stream having a concentration less than that in the azeotrope, it is possible to obtain, by simple distillation, an anhydrous hydrazine stream at the top of the column, under a pressure different from that of the starting solution. The starting solution is conventionally under 1 bar but can be under a lower or higher (partial) pressure. Likewise, the (partial) pressure prevailing in the column can be greater or lower, according to the law of variation of the azeotrope. It is subsequently sufficient to bring the top stream of the column to the desired pressure, generally 1 bar.

Thus, for example, a stream of 1350 g of a solution which is substantially azeotropic under 1 bar produces, on the one hand, 1250 g of a solution comprising 67.6% by weight of hydrazine and, on the other hand, 100 g of anhydrous hydrazine (water content of less than 0.1%).

The solution in the pipe (1) can originate from a second column (6). This column is fed via a pipe (7) which comprises an unconcentrated aqueous hydrazine solution. The term "unconcentrated" is understood to mean that the composition is not substantially that of the azeotrope and differs from that of the azeotrope by at least 1% and preferably by at least 2%. For example, the column (6) is fed with a solution comprising 67.2% by weight of hydrazine. The column (6) operates under 1 bar, the temperature of the top condenser is approximately 101.5° C. while the temperature of the bottom boiler is approximately 120° C. An aqueous hydrazine solution diluted to approximately 5% by weight is recovered at the top via the pipe (9). The starting solution described above is recovered at the bottom via the pipe (1). This column (6) can, of course, operate under other operating conditions. This column might be replaced by any device appropriate for the production of hydrazine.

As represented in the FIGURE, the invention makes it possible to recycle, at least in part, the solution in the pipe (5). (It was possible, of course, not to recycle this solution). This solution can be made up with another solution which is more or less concentrated. Thus, the pipe (7) can result from the joining of the pipes (5) and (8).

The invention, in particular with the double distillation described, makes it possible to obtain anhydrous hydrazine without using a third substance.

EXAMPLES

1. Preparation of Anhydrous Hydrazine 2 000 ml of hydrazine hydrate ($N_2H_4 \cdot H_2O$, i.e. 64% of hydrazine) are placed in a round-bottomed flask surmounted by a distillation column comprising 15 perforated plates. The product is brought to boiling at atmospheric pressure (1 atm, 760 mmHg) while flushing with nitrogen and left at total reflux. When the temperatures have stabilized (110° C. at the top and 120° C. at the bottom), the top mixture, rich in water, is continuously removed with a reflux ratio of 12 to 15. During the experiment, the concentration of water in the top product decreased from 99 to 36%. When the concentration in the bottom product is stable, heating is halted. There is then present, in the round-bottomed flask, 1 550 ml of mixture comprising 68.5% of hydrazine.

After cooling, the plant is placed under vacuum at a total pressure of 100 mmHg and the mixture is again brought to boiling while flushing with nitrogen and at total reflux. The temperatures stabilize at 68° C. at the top and 84° C. at the bottom. The top product is withdrawn continuously with a reflux ratio of approximately 15. After withdrawing 50 ml, the distilled product is analyzed. The hydrazine assay is 99.5%.

2. Continuous Preparation of Anhydrous Hydrazine by the Double Distillation Process An aqueous hydrazine solution assaying 64.5% of $N_2H_4$ is fed at a flow rate of 200 ml/h to a laboratory distillation column comprising 15 perforated plates. The feed plate is situated 5 plates above the heating round-bottomed flask. The column operates at a total pressure of 940 mbar while flushing with nitrogen. When the temperatures have stabilized, the reflux ratio is set at 0.5.

When operating under stable conditions, the top temperature is 113.5° C. and the composition of the distillate is 56% $N_2H_4$. The bottom temperature is 119.3° C. and 120 ml/h of an azeotropic solution assaying 68.6% of hydrazine are produced.

This solution is introduced into a second column comprising 17 perforated plates in the top part and a Vigreux column equivalent to 3 theoretical plates in the bottom part. The feed is placed between the Vigreux column and the region of the plates. This column operates at a pressure of 133 mbar while flushing with nitrogen.

When operating under stable conditions, the bottom temperature is 75° C. and the composition of the distillate is 67% $N_2H_4$. The top temperature is 58.6° C. and 6 ml/h of an azeotropic solution assaying 99.7% of hydrazine are produced.

Of course, the invention is not limited to the embodiments described but is capable of numerous alternative forms easily accessible to a person skilled in the art.

What is claimed is:

1. A process for the preparation of anhydrous hydrazine comprising:
   (i) first distilling an unconcentrated aqueous hydrazine solution to provide a starting binary solution with increased hydrazine concentration;
   (ii) second distilling the starting binary solution at a distillation pressure between 50–400 mbar such that the concentration of hydrazine in a hydrazine-water azeotrope at the distillation pressure is less than the concentration of hydrazine in the binary solution from (i), wherein the second distilling is conducted with a top temperature corresponding to the boiling point of anhydrous hydrazine at the distillation pressure and a bottom temperature corresponding to the boiling point of the hydrazine-water azeotrope at the distillation pressure; and
   (iii) recovering the anhydrous hydrazine.

2. A process according to claim 1, wherein the concentration of hydrazine in the starting binary solution from the first distilling is at least 68%, at 1 bar.

3. A process according to claim 1, wherein the second distilling is carried out at a distillation pressure of 50–150 mbar.

4. A process according to claim 1, wherein the second distilling provides a bottom product of a hydrazine-water azeotrope and this azeotrope is recovered and recycled into the unconcentrated aqueous hydrazine solution used in the first distilling.

5. A process according to claim 1, wherein the first distilling is at a distillation pressure greater than 400 mbar.

6. A process according to claim 1, wherein the anhydrous hydrazine is recovered at the top of a column for the second distilling.

7. A process according to claim 1, wherein the first and second distillings are conducted in the absence of a third substance which alters the hydrazine-water azeotrope concentrations.

8. A process for the preparation of anhydrous hydrazine comprising:
   (i) first distilling an unconcentrated aqueous hydrazine solution to provide a starting binary solution with a hydrazine concentration of less than 70%, at 1 bar, (ii) second distilling the starting binary solution at a distillation pressure between 5–400 mbar such that the concentration of hydrazine in a hydrazine-water azeotrope at the distillation pressure is less than the concentration of hydrazine in the binary solution from (i), wherein the second distilling is conducted with a top temperature corresponding to the boiling point of anhydrous hydrazine at the distillation pressure and a bottom temperature corresponding to the boiling point of the hydrazine-water azeotrope at the distillation pressure; and (iii) recovering the anhydrous hydrazine.

9. A process according to claim 8, wherein the concentration of hydrazine in the starting binary solution is at least 68% but less than 70%, at 1 bar.

10. A process according to claim 8, wherein the second distilling is carried out at a distillation pressure of 50–150 mbar.

11. A process according to claim 8, wherein the second distilling provides a bottom product of a hydrazine-water azeotrope and this azeotrope is recovered and recycled into the unconcentrated aqueous hydrazine solution used in the first distilling.

12. A process according to claim 8, wherein the anhydrous hydrazine is recovered at the top of a column for the second distilling.

13. A process according to claim 8, wherein the first distilling is at a distillation pressure greater than 400 mbar.

14. A process according to claim 8, wherein the first and second distillings are conducted in the absence of a third substance which alters the hydrazine-water azeotrope concentrations.

15. A process for the preparation of anhydrous hydrazine comprising:
   (i) first distilling an unconcentrated aqueous hydrazine solution to provide a starting binary solution with a hydrazine concentration of at least 68% and less than 70%, at 1 bar;
   (ii) second distilling the starting binary solution at a distillation pressure between 50–400 mbar such that the concentration of hydrazine in a hydrazine-water azeotrope at the distillation pressure is less than the concentration of hydrazine in the binary solution from (i), wherein the second distilling is conducted with a top temperature corresponding to the boiling point of anhydrous hydrazine at the distillation pressure and a bottom temperature corresponding to the boiling point of the hydrazine-water azeotrope at the distillation pressure; and
   (iii) recovering the anhydrous hydrazine.

16. The process according to claim 15, wherein the second distilling provides a bottom product of a hydrazine-water azeotrope and this azeotrope is recovered and recycled into the unconcentrated aqueous hydrazine solution used in the first distilling.

17. A process according to claim 15, wherein the anhydrous hydrazine is recovered at the top of a column for the second distilling.

18. A process according to claim 15, wherein the first distilling is at a distillation pressure greater than 400 mbar.

19. A process according to claim 15, wherein the first and second distillings are conducted in the absence of a third substance which alters the hydrazine-water azeotrope concentrations.

* * * * *

UNITED STATES PATENT AND TRADEMARK OFFICE
CERTIFICATE OF CORRECTION

PATENT NO. : 6,849,161 B2
DATED : February 1, 2005
INVENTOR(S) : Jean-Philippe Ricard It is certified that error appears in the above-identified patent and that said Letters Patent is hereby corrected as shown below:

<u>Column 4,</u>
Line 57, "claim 1" should read -- claim 15 --.

Signed and Sealed this

Thirteenth Day of September, 2005

JON W. DUDAS
*Director of the United States Patent and Trademark Office*